United States Patent [19]

Nakashima et al.

[11] Patent Number: 4,742,207

[45] Date of Patent: May 3, 1988

[54] MULTILAYER WELDING METHOD

[75] Inventors: Seiichiro Nakashima; Kenichi Toyoda, both of Hino; Shinsuke Sakakibara, Komae; Tatsuo Karakama, Hino, all of Japan

[73] Assignee: Fanuc Ltd., Minamitsuru, Japan

[21] Appl. No.: 795,278

[22] PCT Filed: Feb. 20, 1985

[86] PCT No.: PCT/JP85/00069

§ 371 Date: Oct. 15, 1985

§ 102(e) Date: Oct. 15, 1985

[87] PCT Pub. No.: WO85/03783

PCT Pub. Date: Aug. 29, 1985

[30] Foreign Application Priority Data

Feb. 20, 1984 [JP] Japan .................................. 59-029887

[51] Int. Cl.$^4$ ................................................ B23K 9/12
[52] U.S. Cl. ..................................... 219/125.1; 901/42
[58] Field of Search .......................... 219/125.1, 124.22; 901/42

[56] References Cited

U.S. PATENT DOCUMENTS 4,508,953 4/1985 Murakami et al. ............... 219/125.1

Primary Examiner—Clifford C. Shaw
Attorney, Agent, or Firm—Staas & Halsey

[57] ABSTRACT

A scaling method in an automatic welding machine equipped with a robot control unit for controlling a robot grasping a welding torch. The robot control unit obtains subsequent taught positions on the basis of taught position data indicative of primary welding points (P1, ... Pn)) of a welding workpiece. The scaling method includes computing the direction of a normal vector ($\vec{N}$) of the surface of the workpiece (WK) based on position data (Q1, Q2, Q3) indicative of any three points on the surface of the workpiece (WK), and obtaining, by correction, scaling points corresponding to the primary welding points on the basis of the direction of the normal vector $\vec{N}$.

4 Claims, 9 Drawing Sheets

MULTILAYER WELDING METHOD

BACKGROUND OF THE INVENTION

This invention relates to a scaling method for an automatic welding machine, particularly a scaling method for an automatic welding machine that makes scaling possible on a three-dimensional, gently curved surface.

Figure 1:
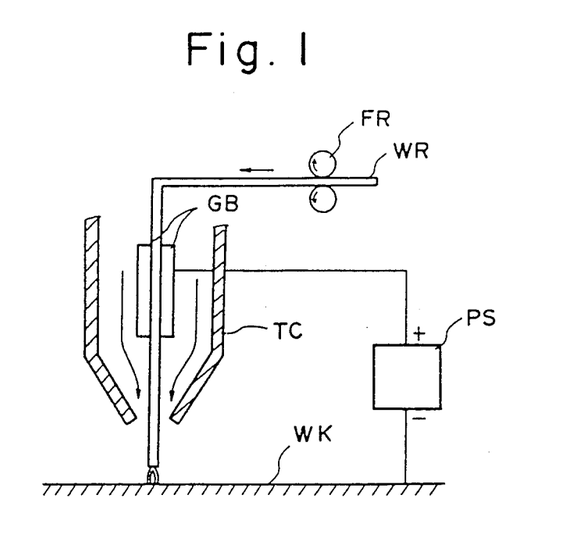
FIG. 1 is a schematic view of an automatic welding machine.

An automatic welding machine performs welding by impressing a voltage across a wire and a workpiece to produce an arc at the tip of the wire, and moving the wire tip along a welding path while the wire is successively paid out in small increments. FIG. 1 is a simplified view of such a welding machine. In the Figure, WR denotes the wire, which is paid out in small increments in the direction of the arrow by feed rollers FR, so that its tip protrudes from the end of a torch TC via guide member GB, with the amount by which the wire is fed being controlled in such a manner that the tip comes to occupy a position spaced a predetermined distance from the surface of the workpiece WK. PS represents a welding power supply for generating an intermittent high voltage having a predetermined period. The plus side of the high-voltage is applied to the wire WR through the guide member GB, and the minus side is applied to the workpiece WK. In the welding machine, carbon dioxide gas ($CO_2$) from a gas supply unit (not shown) is supplied through the interior of the torch TC in the direction of the arrows so as to impinge upon the workpiece and prevent the oxidation thereof.

Figure 2:
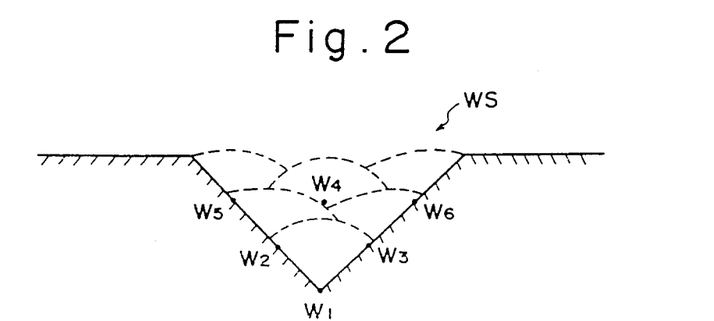
FIG. 2 is a sectional view of multi-layer welding at a welding starting point.

When a high voltage is generated intermittently by the welding power supply PS while the carbon dioxide gas ($CO_2$) is fed from the gas supply unit and the wire WR is paid out in small increments, an arc is produced at the tip of the wire WR, and both the wire and the workpiece are melted to weld the fused portions of the workpiece together. Recently, welding robots in which such a welding operation is performed by a robot, have come into use. Specifically, a welding robot performs welding by grasping the torch of a welding machine and causing the robot to move the torch (the tip of the wire) along a welding path. In order for such a welding robot to perform welding at predetermined locations on the workpiece, it is necessary for the robot to be taught the positions to which the torch is to be moved, the torch traveling speed, and the like. Also, there are various welding modes. When welding is merely performed once in linear fashion, teaching the robot is simple but the weld formed by such welding is weak in strength. Accordingly, so-called multi-layer welding, in which welding is repeatedly performed in overlapping fashion, is frequently used. In a case where such multi-layer welding is performed, the robot uses primary taught position data, which serves as a basis for welding in one plane, to derive all subsequent taught position data. This will be described in further detail with reference to FIG. 2. FIG. 2 is a sectional view of welding starting points for a multi-layer welded portion in a multi-layer welding operation. In the Figure, W1, W2 ... W6 denote welding starting points of respective layers. The welding starting point W1 of the first layer is the vertex of the welded portion (groove). The operator teaches position data indicative of the welding starting point W1 as primary taught data. The point W1 serves as a foundation on the basis of which taught position data from this point onward are obtained. Scaling refers to the process of obtaining subsequent taught positions on the basis of primary taught position data.

Conventionally, scaling is premised on the fact that a group of primary taught points, which serve as the basis for scaling in order to perform automatic welding, are taught on a single plane. In other words, according to the conventional scaling method, an offset width becomes discontinuous at a line of intersection between planes when the points are not taught in a single plane. As a result, scaling cannot be carried out. The reason for this will now be described with reference to FIG. 3 and FIGS. 4(a), (b).

Figure 3:
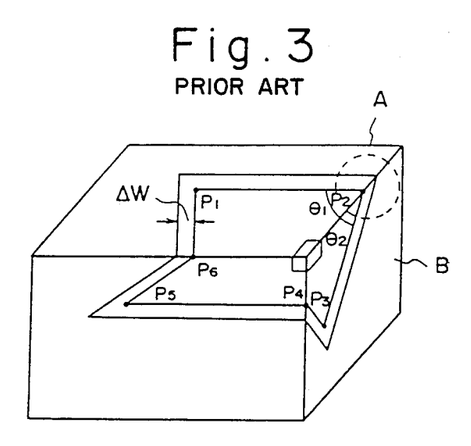
FIG. 3 is a diagram showing a problem encountered in the prior art.
Figure 4A:
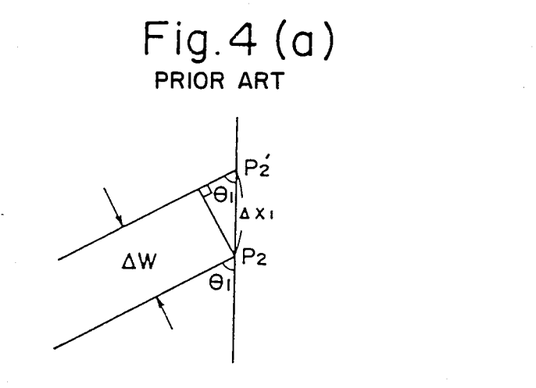
FIGS. 4(a), (b) are partially enlarged views of FIG. 3.
Figure 4B:
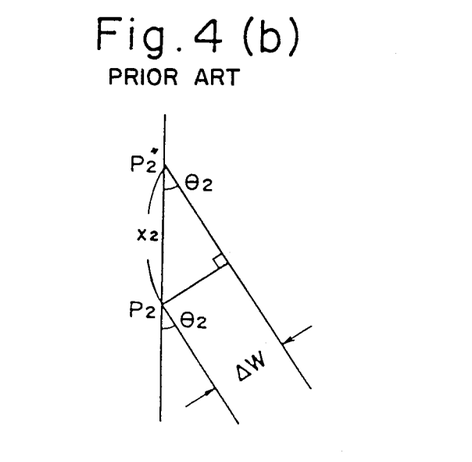

FIG. 3 is a diagram for describing a problem encountered when it is attempted to apply scaling to a group of taught points P1–P6 by offsetting these points outwardly by an offset width $_\Delta W$ over three surfaces of a rectangular parallelepiped. FIGS. 4(a), (b) are partially enlarged views taken at the point P2 in FIG. 3.

Let us now describe the problems of the prior art based on these drawings. When it is attempted to perform scaling of offset width $_\Delta W$ from two surfaces A, B at a point P2 lying at the intersection of the surfaces of the rectangular parallelepiped, a scaling width $_\Delta x_1$ at the edge of surface A is obtained as follows:

$$_\Delta W/_\Delta x_1 = \sin \theta_1 \therefore _\Delta x_1 = _\Delta W/\sin \theta_1$$

where $\theta_1$ represents the angle between a line along which welding is performed and the edge formed by the surfaces A, B, and $_\Delta W$ represents the offset width.

Scaling width $_\Delta x_2$ at the edge of surface B is obtained as follows:

$$_\Delta W/_\Delta x_2 = \sin \theta_2 \therefore _\Delta x_2 = _\Delta W/\sin \theta_2$$

where $\theta_2$ represents the angle between a line along which welding is performed and the edge formed by the surfaces A, B, and $_\Delta W$ represents the offset width. Accordingly, as long as the angles $\theta_1$, $\theta_2$ are unequal, $_\Delta x_1 = _\Delta x_2$ will not hold and the taught data set by scaling will be discontinuous at the edge portion of the rectangular parallelepiped. This makes scaling impossible.

This generally holds true even for three-dimensional curved surfaces, and the state of the art is such that scaling cannot be performed on three-dimensional curved surfaces.

However, cases are increasing in which welding is being applied to workpieces having three-dimensional curved surfaces, such as the gentle curved surfaces of automobile bonnets and the like. The fact that scaling cannot be applied to such workpieces limits scaling solely to perfect planes, thus diminishing the utility value of welding robots.

SUMMARY OF THE INVENTION

The present invention has been devised to solve the aforementioned problems encountered in the conventionally used scaling method, and its object is to provide a scaling method in an automatic welding machine that makes it possible to perform scaling on a three-dimensional, gently curved surface at continuous taught points corresponding to a primary taught position on the basis of a set offset width.

According to the present invention, there is provided a scaling method in an automatic welding machine equipped with a robot control unit for controlling a robot grasping a welding torch, the robot control unit obtaining taught positions from a taught scaling starting point onward on the basis of taught position data indicative of primary welding points (p1–Pn) of a welding workpiece and an offset width to perform multi-layer welding. The robot control unit computes the direction of a normal vector ($\vec{n}$) of the workpiece surface and an amount of shift in said direction based on position data indicative of any three points on the workpiece surface, and corrects scaling points corresponding to the primary welding points on the basis of the direction of the normal vector ($\vec{n}$) and the amount of shift in the direction.

By providing the present invention, scaling points corresponding to primary welding points are obtained by correction based on the direction of the normal vector (n), which is obtained by correction based on the position data indicative of any three points on the surface of the workpiece. Accurate scaling therefore can be carried out even for a workpiece having a three-dimensional curved surface. Accordingly, an automatic welding machine is provided with a wider range of scaling applications and can be applied to a wider variety of workpieces. In addition, since the scaling method is implemented by the robot control unit for controlling the robot that operates the welding torch, the method can be executed rapidly and reliably.

DETAILED DESCRIPTION OF THE PREFERRED EMBODIMENT

Figure 5:
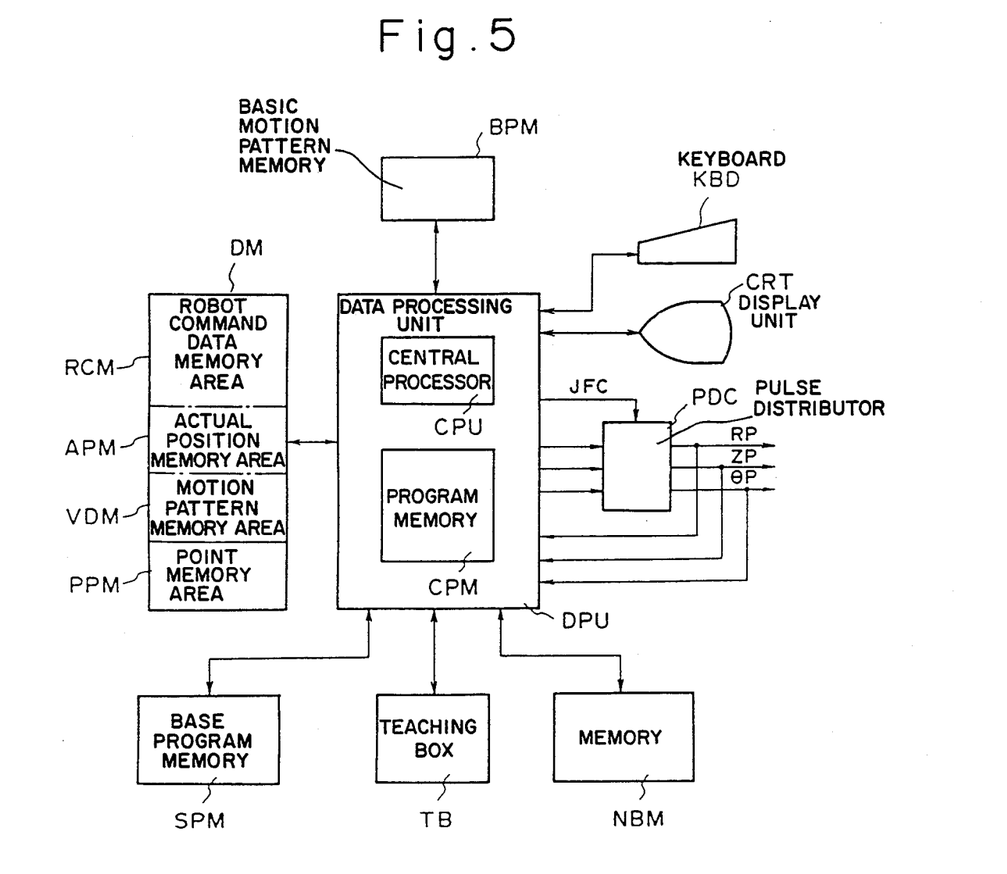
FIG. 5 is a block diagram of an apparatus for practicing the scaling method of the present invention.

FIG. 5 is a block diagram of an embodiment of a robot control unit for practicing a scaling method according to the present invention. Hereinafter, the term "scaling method" will refer to a method of obtaining position data based on an offset value from the taught position data and robot command data. In the drawing, DPU represents a data processing unit having a central processor CPU and a read-only program memory CPM storing a program for automatically creating robot command data. BPM designates a basic motion pattern memory storing basic motion patterns of a robot. DM is a data memory having a robot command data memory area RCM for storing a series of robot command data comprising sequence numbers, service codes and the like, an actual position memory area APM for storing the actual positions of a robot hand, which is holding a torch, along R, Z and $\theta$ axes, a motion pattern memory area VDM for storing data indicative of combined basic motion patterns of the robot, and a point memory area PPM for storing the positions of points on the motion patterns. SPM represents a base program memory for storing the correlation (base program) between sequence numbers in the robot command program and point numbers specifying the points on the motion patterns.

TB denotes a teaching box having a mode selection switch for selecting such modes as a teach mode (+), repeat (playback) operation mode (RP) and the like, an override switch for applying an override to jog feedrate and feed rate at the time of automatic robot operation, jog buttons for jog-feeding the hand in the positive and negative directions along the R, Z and $\theta$ axes, respectively, a position record button for setting the actual hand position, which is stored in the data memory DM, as the position of each point, and numeric keys. CRT is a display unit for displaying (1) a combination of basic motion patterns, and (2) motion patterns and point numbers specifying respective points when the correlation between sequence numbers and point numbers is entered. KBD designates a keyboard for entering various working conditions. PDC is a pulse distributor which, on the basis of a control signal delivered by the data processing unit DPU, outputs pulse signals RP, ZP, $\theta$P for driving a drive unit that effects motion along the R, Z and $\theta$ axes of the robot.

Figure 7:
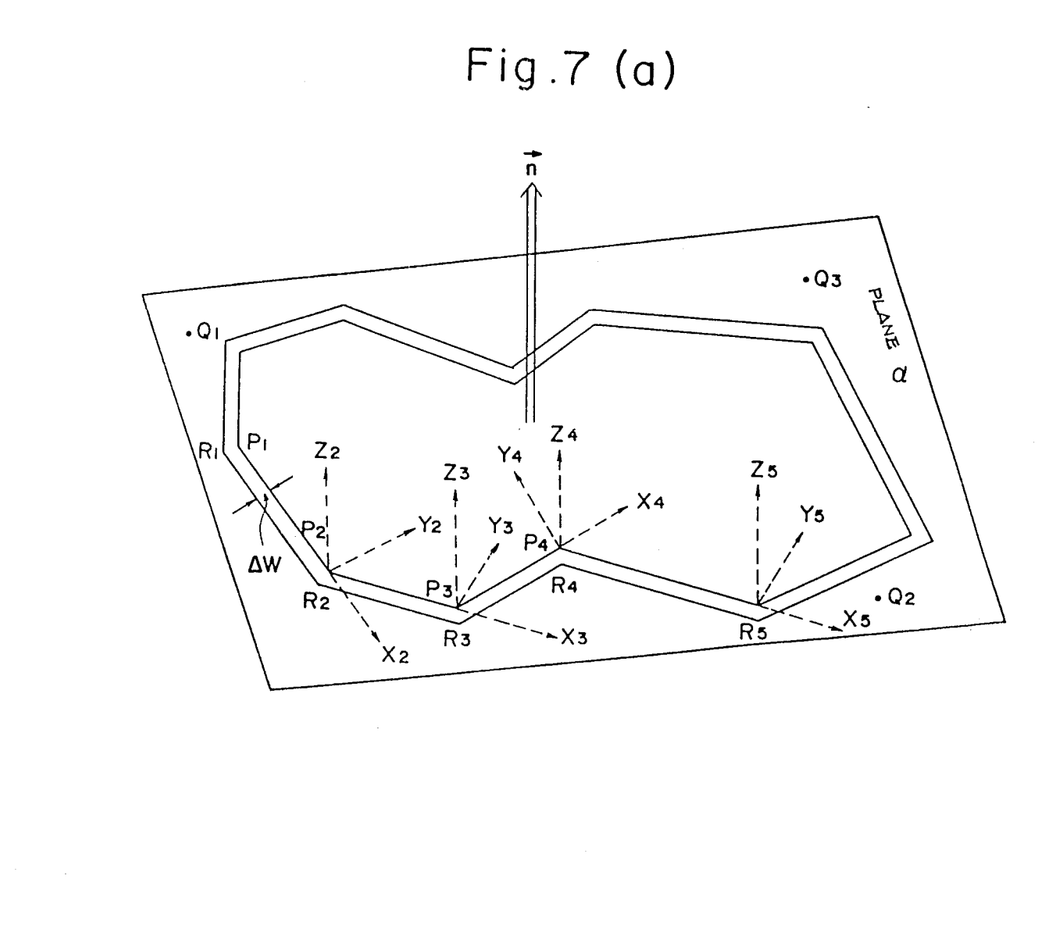
FIGS. 7(a) through (d) are detailed diagram for explaining a scaling method according to the present invention.

A scaling method using the robot control unit having the foregoing construction will now be described with reference to FIGS. 6 through 8.

Figure 6:
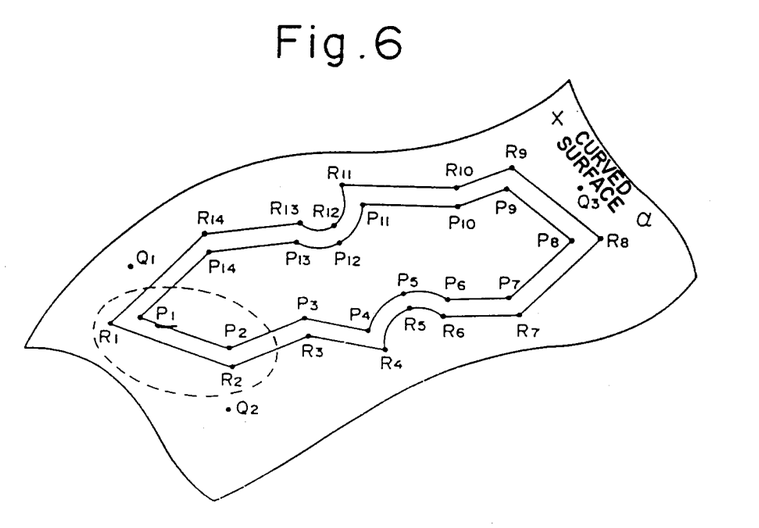
FIG. 6 is a diagram of scaling applied to a gently curving surface according to the present invention.
Figure 7D:
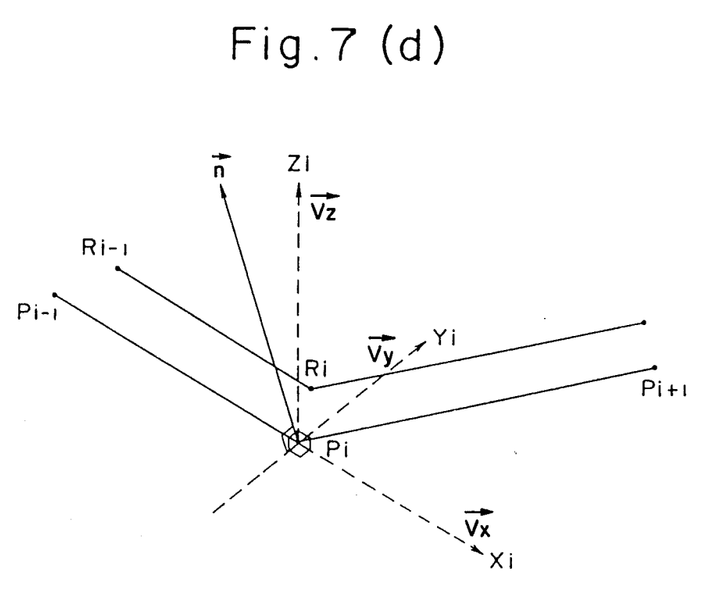
Figure 8:
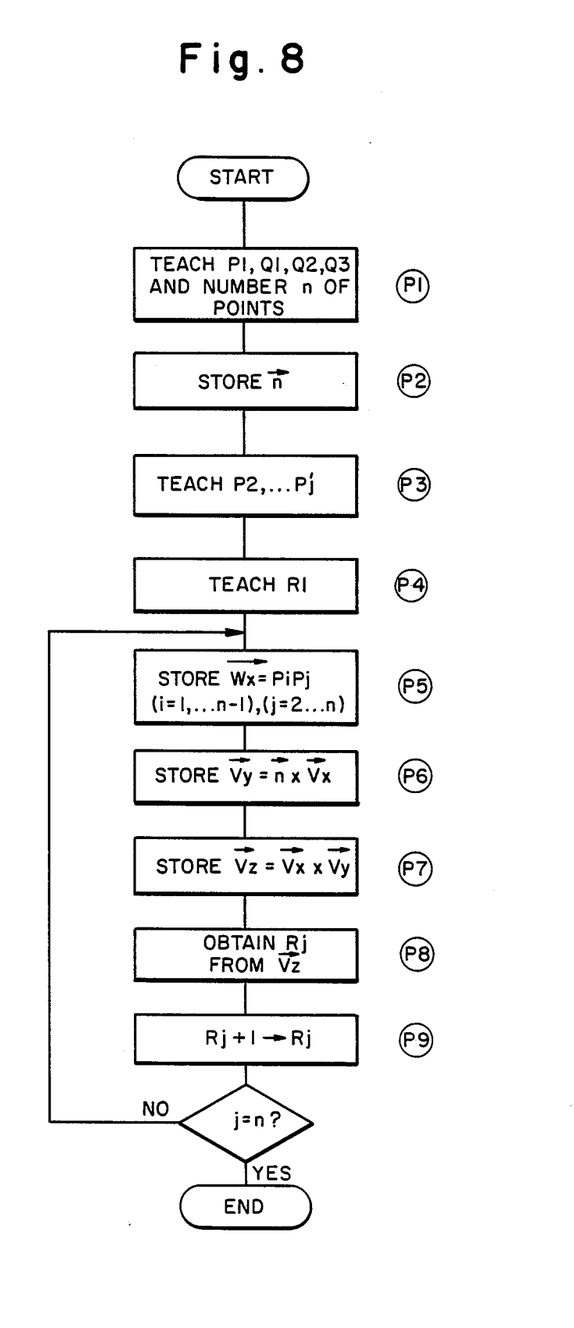
FIG. 8 is a flowchart for an example of operation based on the scaling method of the present invention.

FIG. 6 is an overall view of scaling applied to a three-dimensional, gently curved surface $\alpha$. a FIGS. 7(a)–7(d) are detailed diagrams for explaining a scaling method according to the present invention. FIG. 8 is a flowchart for the operation of an embodiment of a scaling method according to the present invention. The scaling method will now be described in detail based on these drawings.

(1) The first step is to teach a primary welding starting point P1, three points Q1, Q2, Q3 and the number (n=14) of primary welding points on the curved surface $\alpha$. Specifically, the robot is placed in the manual mode, and the operator uses the teaching box TB to provide the data processing unit DPU with position information indicative of the primary welding starting point P1 and the three points Q1, Q2, Q3 that determine the pseudo-plane, and with the number (n=14) of primary welding points. When this is carried out, the central processor CPU of the data processing unit DPU stores the position information in the point memory area PPM of data memory DM (step P1).

(2) Next, the central processor CPU computes a normal direction vector relating to the psuedo-plane based on the three points Q1, Q2, Q3 on the curved surface $\alpha$, and the results of the calculation are stored in the data memory DM at a predetermined vacant address thereof (step P2).

(3) The primary welding points P2 through P14 on the pseudo-plane are taught. Specifically, the operator uses the teaching box to bring the tip of the wire projecting from the distal end of the torch to each of the primary welding points P2 through P14 while moving the hand of the welding robot along a predetermined path, and the position information indicative of each welding point is fed into the data processing unit DPU. When this has been accomplished, the central processor CPU stores the position information indicative of the welding points in the point memory area PPM of the data memory DM (step P3).

In the foregoing teaching operation, a case in which the primary welding points P1–P14 are great distances from the pseudo-plane defined by the three points Q1, Q2, Q3 is assumed to be indicative of an error.

(4) The central processor CPU applies scaling to scaling points R1 through R14 on the basis of welding points P1 through P14. How these scaling points are determined will be described in detail with reference to FIGS. 7(a) through (d). We will describe a method of determining the scaling point R2 in FIG. 6 as an example.

(a) First, the operator teaches a scaling starting point R1. Specifically, using the teaching box, the operator enters position information indicative of a scaling starting point R1 corresponding to the primary welding starting point P1. The central processor CPU responds by storing the information in the point memory area PPM of the data memory DM (step P4).

(b) Next, the central processor CPU computes a vector in a direction from the primary welding starting point P1 to the next welding point P2, namely a vector $\vec{Vx} = \overline{P1P2}$ along the X axis, and stores the vector in the data memory DM at a predetermined vacant address thereof (step P5).

(c) The central processor CPU then takes the cross product of the normal vector $\vec{n}$ and the vector $\vec{Vx}$ along the X axis to compute a vector $\vec{Vy}$ along the Y axis, and the vector $\vec{Vy}$ is stored in the data memory DM at a predetermined vacant address thereof (step P6). It should be noted that the vector $\vec{Vy}$ along the Y axis lies in a direction orthogonal to the plane defined by the vector $\vec{Vx}$ along the X axis and the normal vector $\vec{n}$.

(d) Next, the central processor CPU takes the cross product of the vector $\vec{Vx}$ along the X axis and the vector $\vec{Vy}$ along the Y axis to compute a vector $\vec{Vz}$ along the Z axis, and the vector $\vec{Vz}$ is stored in the data memory DM at a predetermined vacant address thereof (step P7). It should be noted that the vector $\vec{Vz}$ along the Z axis lies in a direction orthogonal to the plane defined by the vector $\vec{Vx}$ along the X axis and the vector $\vec{Vy}$ along the Y axis.

(e) The central processor CPU then obtains the scaling point R2 based on the vector $\vec{Vz}$ along the Z axis, the offset width $\Delta W$ and the amount of shift $\Delta h$. This is stored in the point memory area PPM of the data memory DM (step P8).

(f) Next, the central processor CPU repeats the same steps P5 through P8 with regard to the above-mentioned welding point P3 to successively obtain the subsequent scaling points R3, R4, . . . R14 and stores these points in the point memory area PPM of the data memory DM (step P9).

A connecting method for performing multi-layer welding upon obtaining a scaling point R2 will now be described in still greater detail with reference to FIGS. 7(a), (b).

FIG. 7(a) is an example of scaling applied to an offset width $\Delta W$ from a group of points Pi taught on a single plane $\alpha$. In the present embodiment, we shall assume that a correction value $\Delta h$ in scaling in the direction of the normal vector $\vec{n}$ is 0 in order to simplify the description. In other words, a group of points following scaling will lie on the plane $\alpha$. To calculate the positions of the group of points Ri (i=2, 3, 4) after scaling, a coordinate system separate from a reference coordinate system is set for each point Pi, as illustrated. Ri is then calculated as an intersection between two straight lines Ri−1Ri and RiRi+1 illustrated in FIG. 7(c) based on the set coordinate system (hereafter referred to as the "solution-finding" coordinate system), and the value of Ri in the solution-finding coordinate system is restored to a value in the reference coordinate system by a coordinate transformation to determine the coordinates of Ri. The method of this coordinate transformation is a well-known method based on three fundamental axes and a description thereof is deleted. In other words, letting Rxi, Ryi, Rzi represent the coordinate values of the scaling point Ri in FIG. 7(c), we will have the following:

$Rxi = -_\Delta W \tan \theta/2$
$Ryi = _\Delta W$
$Rzi = 0$

In the present embodiment (FIGS. 7(a), (c)), Rzi will be 0 since the amount of shift along the normal vector ($\vec{n}$) is 0. However, on a curved surface, the amount of shift $\Delta h$ is ordinarily determined as follows. The amount of shift $\Delta h$ is calculated by teaching the scaling starting point R1, as in the case of $\Delta W$, and is the distance from the point R1 to a psuedo-plane imaged on the curved surface.

Next, a method of determining a correction direction based on the amount of shift $\Delta h$ at the point Ri will be described.

FIG. 7(b) illustrates a case where the group of taught points Pi, rather than lying on a perfect plane, are taught on a gently curving surface B. As opposed to FIG. 7(a) where the direction of the normal vector ($\vec{n}$) and the directions of all vectors $\vec{Zi}$ at points Pi coincide ($\Delta h = 0$) the directions of the vectors $\vec{Zi}$ in FIG. 7(b) are diverse at each and every point Pi and do not coincide with the direction of the normal vector ($\vec{n}$). If there were a method through which each of these vectors $\vec{Zi}$ could be determined by utilizing the normal vector ($\vec{n}$), then the object which is to determine a scaling point Ri on a curved surface could be attained by a method exactly the same as that (see FIG. 7(a)) used to obtain the scaling point Ri on a plane.

Such a method will now be described based on FIG. 7(d). In general, the normal vector ($\vec{n}$) and the vector $\vec{Xi}$ do not intersect orthogonally. Accordingly, we first determine the vector $\vec{Yi}$ from $\vec{Yi} = (\vec{n}) \times \vec{Xi}$. The vector $\vec{Yi}$ will be perpendicular to the vector $\vec{Xi}$ and the normal vector ($\vec{n}$).

The vector $\vec{Zi}$ is then determined based on $\vec{Zi} = \vec{Xi} \times \vec{Yi}$. Since $\vec{Xi}, \vec{Yi}, \vec{Zi}$ are perpendicular to one another, these can serve as the three fundamental axes of an orthogonal coordinate system.

A scaling method in accordance with the present invention makes it possible to perform scaling on a three-dimensional curved surface. Therefore, the invention is well-suited for use in the automatic welding of a workpiece having a three-dimensional, gently curved surface such as the bonnet of an automobile.

What is claimed is:

1. A scaling method in an automatic welding machine equipped with a robot control unit for controlling a robot grasping a welding torch, the robot control unit obtaining taught positions from a taught scaling starting point onward on the basis of taught position data indicative of primary welding points P1, . . . Pn of a welding workpiece and an offset width, to perform multi-layer welding, said method comprising the steps of:

(a) entering position data indicative of any three points on a surface of the workpiece and storing the position data in memory using the robot control unit;

(b) computing the direction of a normal vector $\vec{n}$ of the workpiece surface and an amount fo shift in the direction based on the position data indicative of the three points on the workpiece surface using the robot control unit; and (c) correcting scaling points corresponding to the primary welding points on the basis of the direction of the normal vector $\vec{n}$ and the amount of shift in the direction, using the robot control unit.

2. A scaling method in an automatic welding machine according to claim 1, wherein said step (c) of correcting the scaling points includes the following sub-steps:

(c1) computing an X-axis vector ($\vec{Vx} = \overline{PiPj}$) of a primary welding point and storing the X-axis vector in memory;

(c2) taking the cross product of the normal vector $\vec{n}$ and the X-axis vector to compute a Y-axis vector ($\vec{Vy} = \vec{n} \times \vec{Vx}$), and storing the Y-axis vector in memory;

(c3) taking the cross product of the X-axis vector and the Y-axis vector to calculate a Z-axis vector ($\vec{Vz} = \vec{Vx} \times \vec{Vy}$), and storing the Z-axis vector in memory; and (c4) obtaining a scaling point based on the Z-axis vector and the amount of shift in the direction.

3. A scaling method for obtaining scaling points corresponding to taught position data indicative of primary welding points on a workpiece to be welded by an automatic welding machine, comprising the steps of:

(a) entering position data indicative of three points on a surface of the workpiece, and storing the position data;

(b) computing the direction of a normal vector with respect to the workpiece surface and an amount of shift along the normal vector based on the position data indicative of the three points on the workpiece surface; and (c) obtaining scaling points corresponding to the primary welding points on the basis of the direction of the normal vector and the amount of shift along the normal vector.

4. A scaling method according to claim 3, wherein said step (c) comprises performing the following sub-steps for each of the primary welding points:

(c1) computing an X-axis vector of the primary welding point and storing the X-axis vector;

(c2) computing a Y-axis vector by taking the cross product of the normal vector and the X-axis vector, and storing the Y-axis vector; p1 (c3) calculating a Z-axis vector by taking the cross product of the X-axis vector and the Y-axis vector, and storing the Z-axis vector; and (c4) obtaining a scaling point based on the Z-axis vector.

* * * * *

UNITED STATES PATENT AND TRADEMARK OFFICE
CERTIFICATE OF CORRECTION

PATENT NO. : 4,742,207

DATED : MAY 3, 1988

INVENTOR(S) : SEIICHIRO NAKASHIMA ET AL.

It is certified that error appears in the above-identified patent and that said Letters Patent is hereby corrected as shown below:

Col. 6, line 67, "fo" should be --of--.

Signed and Sealed this

Sixteenth Day of August, 1988

Attest:

DONALD J. QUIGG

*Attesting Officer*   *Commissioner of Patents and Trademarks*